United States Patent [19]
Dows

[11] 3,990,716
[45] Nov. 9, 1976

[54] RESILIENT STEERING STABILIZER

[76] Inventor: Parker G. Dows, 116 Saville St., Saugus, Mass. 01906

[22] Filed: Sept. 2, 1975

[21] Appl. No.: 609,491

[52] U.S. Cl. ............................................. 280/271
[51] Int. Cl.² ........................................ B62K 21/10
[58] Field of Search .............. 280/272, 271, 94, 89; 267/70

[56] References Cited
UNITED STATES PATENTS

| | | | |
|---|---|---|---|
| 371,234 | 10/1887 | Veeder | 280/271 |
| 393,904 | 12/1888 | Henry | 280/271 |
| 410,335 | 9/1889 | Sanborn | 280/271 |
| 420,416 | 1/1890 | Readio | 280/271 |
| 565,718 | 8/1896 | Boardman | 280/271 |
| 608,539 | 8/1898 | Barto | 280/271 |
| 1,248,014 | 11/1917 | Ross | 280/94 |
| 1,525,660 | 2/1925 | Savidge | 280/94 |
| 2,087,535 | 4/1936 | Dall | 280/272 |
| 2,103,674 | 12/1937 | Jackson | 280/272 |

*Primary Examiner*—Kenneth H. Betts
*Attorney, Agent, or Firm*—Thomas C. Stover, Jr.

[57] ABSTRACT

A resilient steering stabilizer for cycles, e.g. a bicycle is provided wherein a pair of crank arms, one on each side of the steering fork of the cycle connects respectively with a pair of pivot arms which turn on a common axle mounted on the cycle frame. Each pivot arm turns against and compresses helical springs mounted on such frame, on both sides of the axle, which springs resist excessive turning of the steering wheel of the cycle. The stabilizer of the invention is, in brief, a centering device which, by spring compression, tends to center a cycle steering wheel or other desired apparatus component.

10 Claims, 10 Drawing Figures

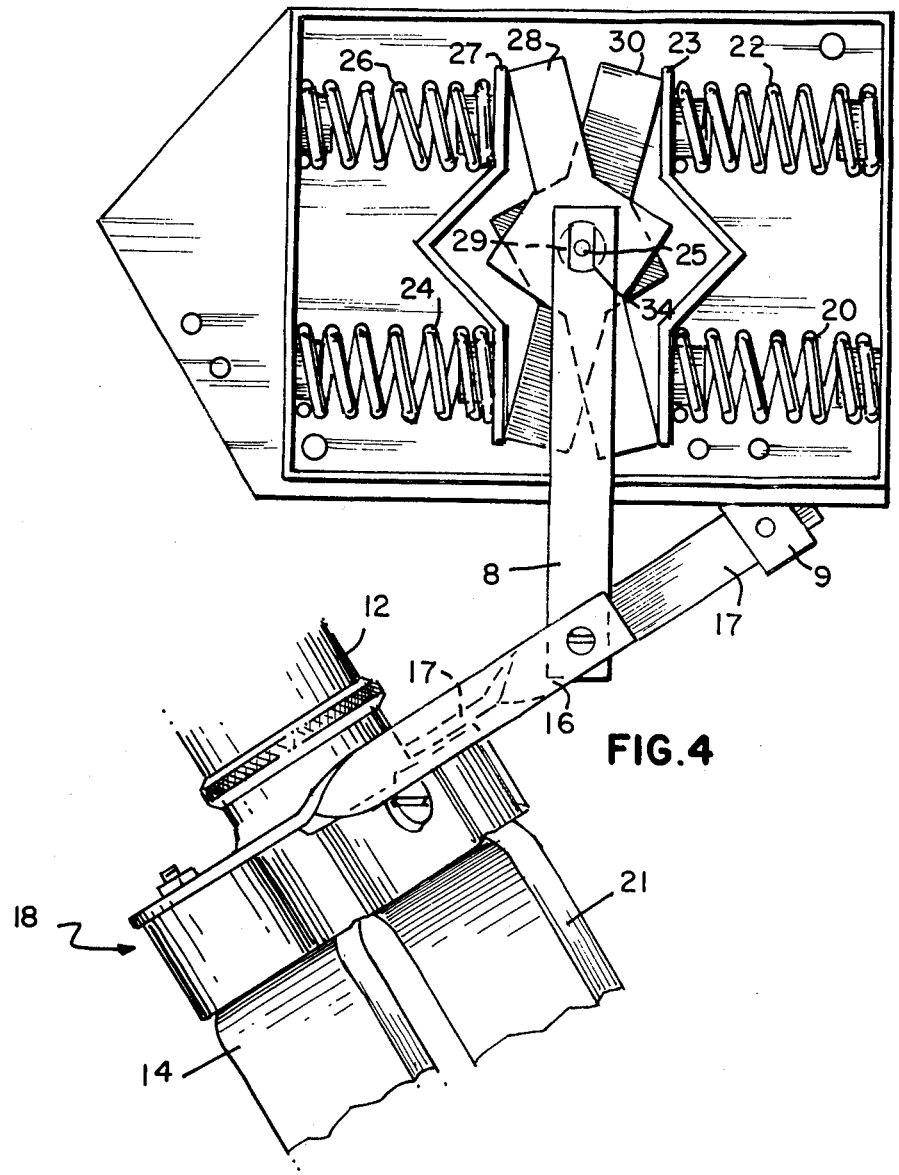

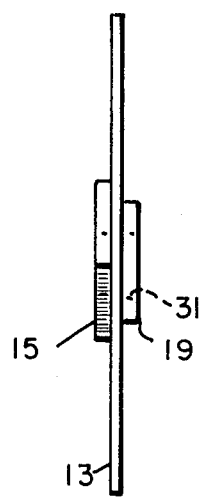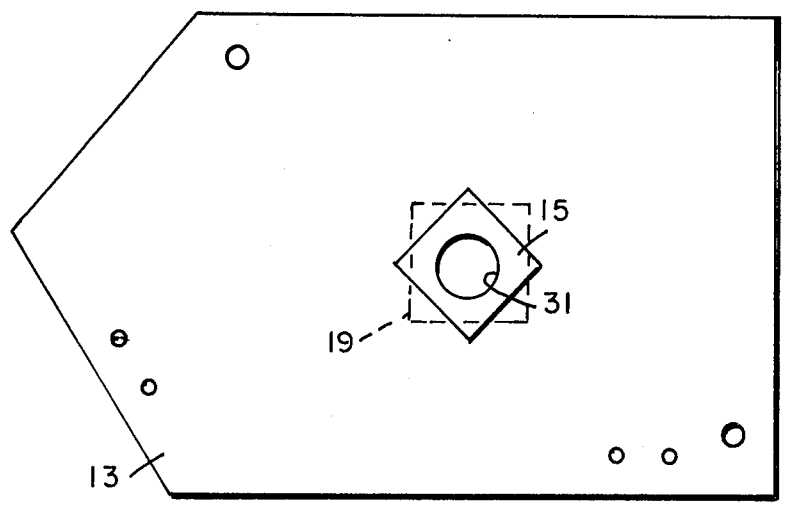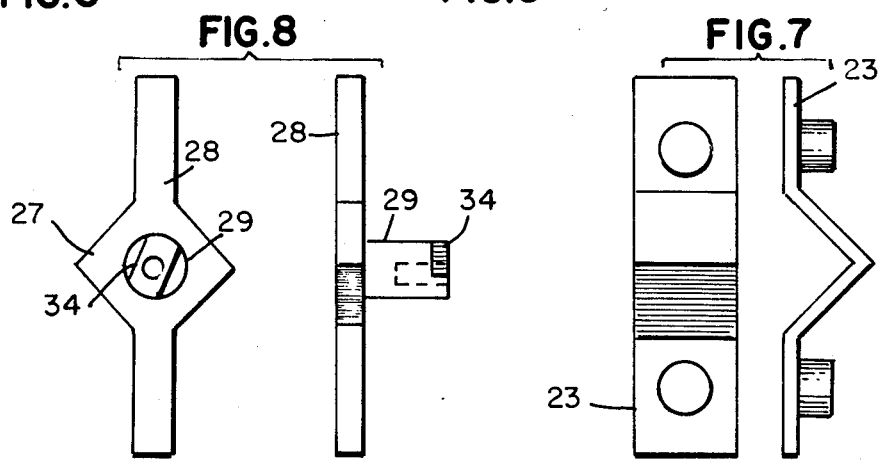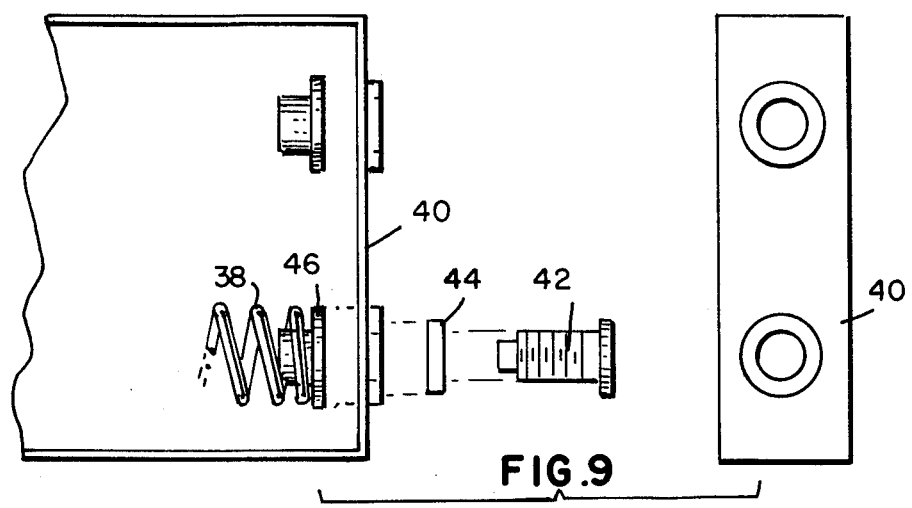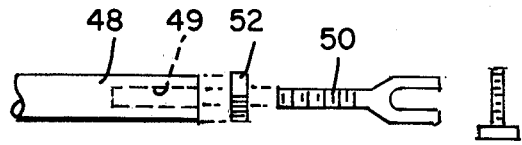

RESILIENT STEERING STABILIZER

FIELD OF THE INVENTION

This invention relates to a safety steering stabilizer for cycle vehicles, particularly for stabilizing the front turning wheel of cycles.

THE PRIOR ART

An oft occuring hazard in bicycling, tricycling or other cycling is a tendency of the steering wheel of the cycle to abruptly turn or jackknife causing the vehicle to stop suddenly or go out of control. Jackknifing of a cycle can occur even with experienced riders. It can occur, for examples, if the handle bars are released or the front wheel strikes an object or depression in the road.

Spring restraining means applied to the steering of bicycles have been proposed; see for example U.S. Pat. Nos. 2,087,535 to Dall (1936), 608,539 to Barto (1898) and 410,335 to Sanborn (1889). These disclosures have proposed spring mountings which inhibit the turning of the bicycle steering wheels by alternate extension and contraction of springs which tend to weaken the effectiveness of the springs with use. Further, the springs are exposed and present a hazard of injury to the operator of the cycle or of catching the clothes of the user. There is therefore a need and market for a cycle steering stabilizer which is compact, durable and out of the way of the user and is effective in preventing the ever present threat of jackknifing to provide safer bicycling.

There has now been developed an apparatus for preventing the jackknifing of the steering wheel of cycles without impairing the steering capability thereof. Such steering stabilizer is compact, durable and adjustable to fit various cycles including bicycles and permit the steering wheel of the cycle full turning while resiliently resisting excessive or unintended turning thereof. The invention provides an automatic centering device for cycles, vehicles and machines which enhances the safety and control thereof.

SUMMARY

There has now been discovered a safety steering stabilizer for cycles, including bicycles, designated herein as a resilient steering stabilizer for cycles comprising, at least one crank arm, one end of said crank arm connecting to a rotatable portion of the steering column of said cycle; a pivot arm which turns around a pivot means; the other end of said crank arm connecting to said pivot arm; a plurality of resisting springs mounted on said cycle in contact with said pivot arm to resiliently resist excessive turning of the steering wheel of said cycle.

DESCRIPTION

These and other novel features will become apparent from the following detailed specification and drawings in which:

FIG. 4 is a sectional elevation view of the apparatus shown in FIG. 2 in operation.

FIG. 5 is a side elevation view of a component of the steering stabilizer embodying the invention.

FIG. 6 is an end elevation view of the component shown in FIG. 5 taken on line 6—6, looking in the direction of the arrows.

FIG. 7 are plan and elevation views of certain components of the steering stabilizer embodying the invention.

FIG. 8 are plan and elevation views of other components of the steering stabilizer embodying the invention.

FIG. 9 is an exploded partial elevation view of another component embodiment of the present invention, and FIG. 10 is an exploded partial elevation view of yet another component embodiment of the present invention.

Figure 1:
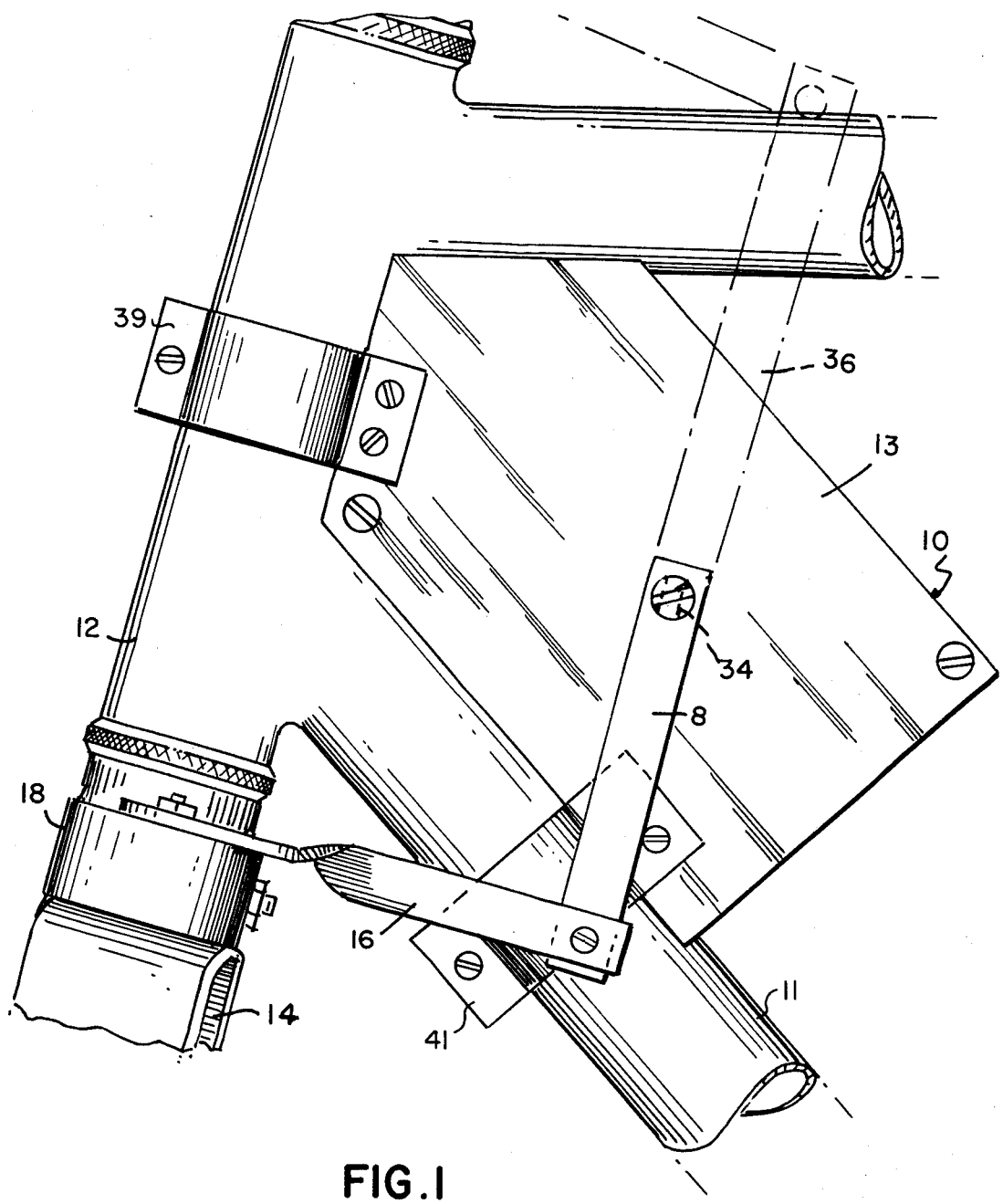
FIG. 1 is an elevation view of the apparatus embodying the invention installed on a bicycle frame.

Referring now to the drawings, steering stabilizer box 10 is mounted on bicycle frame 11 by clamps 39 and 41, with a pair of crank arms 8 and 16 and 9 and 17, connected respectively to the steering fork (clamp) 18, as shown in FIGS. 1 and 4, such that turning the steering fork pivots the crank arms as discussed below.

Figure 2:
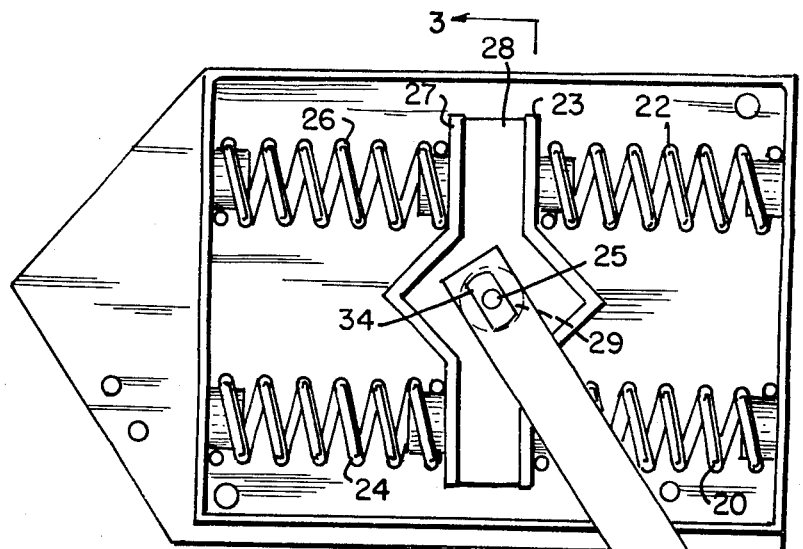
FIG. 2 is a sectional elevation view, partially in schematic, illustrating the workings of the apparatus embodiment of FIG. 1.
Figure 2:
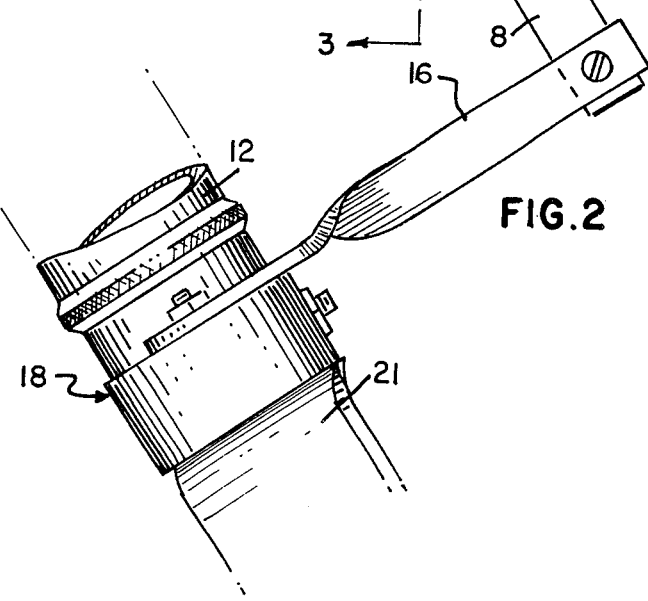

Within the box 10, helical springs 20 and 22 are opposed by helical springs 24 and 26, which springs are connected respectively to bearing plates 23 and 27, which plates press against and are separated by pivot arms 28 and 30 as shown in FIG. 2. Each end of the four helical springs is anchored around a support stud as shown in FIG. 2.

The crank arm 16 is connected to the pivot arm 28 which turns around pivot axle 25 and pushes against bearing plates 27 and 23 and compresses springs 26 and 20 which are mounted on each side of the pivot axle 25, as shown in FIGS. 2 and 4. In like manner, the crank arm 17 is connected to the pivot arm 30, which turns around pivot axle 25, which pushes against bearing plates 27 and 23 and compresses springs 24 and 22 positioned on each side of the pivot axle 25 as also shown in FIGS. 2 and 4.

Accordingly, with the steering wheel straight ahead, the pivot arms 28 and 30 align under pressure of the respective springs 20, 22, 24, and 26, as shown in FIG. 2. When the steering wheel and fork 18 is turned, the crank arms 16 and 17 are pivoted, as are the attached pivot arms 28 and 30 (around pivot axle 25) which displace the bearing plates 23 and 27 and compress the attached springs 20, 22, 24, and 26, as shown in FIG. 4. The four springs exert axial pressure on the pivot arms 28 and 30 and the respective crank arms 16 and 17 which tend to return the steering fork 18 (and thus the steering wheel) to the straight ahead position shown in FIG. 2 and thus resiliently resist excessive turning, including jackknifing, of the steering wheel of the cycle.

The bearing plates 27 and 23 are angled to define a diamond shaped space therebetween, as shown in FIGS. 2, 4 and 7. The pivot arms can, as shown in FIGS. 7 and 8, contour to a diamond shape 27 around the axis thereof, be round or take other shapes as desired. The diamond or circular shape cooperates with the diamond shape defined by the bearing surfaces to maintain such pivot arms centrally located relative to the springs or other resilient means of the steering stabilizer.

Figure 3:
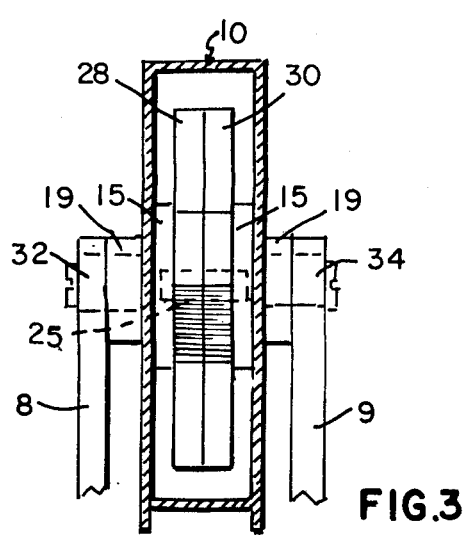
FIG. 3 is a sectional elevation view of the apparatus illustrated in FIG. 2, taken on line 3—3, looking in the direction of the arrows.

The side plates 13 of the steering box 10 also have a raised diamond shaped guide surface 15 as shown in FIGS. 5 and 6, which projects between the bearing plates 27 and 23 to guide and maintain central positioning of such plates and thus the pivot arms 28 and 30, shown in FIGS. 2, 3 and 4. The side plates 13 have an outer rectangular projection 19 therein to provide a lengthened bearing channel 31 for the bearing projection 29 of the pivot arm 28. A like channel (not shown) is provided for the bearing projection of the pivot arm 30.

The pivot axle 25, shown in FIGS. 2, 4 and lengthwise in FIG. 3, extends between the two pivot arms 28 and 30, but not all the way through such pivot arms. The pivot axle 25 is desirable but can be dispensed with, if desired, within the scope of the invention.

The crank arms 16 and 17 either fit over nubs 32 on the pivot arm 30 and over nub 34 on the pivot arm 28 or otherwise are bonded or attached to such pivot arms.

The crank arms 16 and 8 and 17 and 9 are connected respectively to fork arms 14 and 21 of the steering fork 18 and pivot when said fork 18 is turned as shown in FIGS. 1, 2 and 4. Alternatively, such crank arms can be inverted and connected from their respective pivot arms 28 and 30 to the upper portion of the steering column at spaced points thereon or to spaced points on the handle bars of the bicycle as indicated by dotted lines 36 in FIG. 1.

In another embodiment of the invention, the tension of the respective springs can be adjusted, e.g. by fastening spring 38 to the end of the steering box 40 with threaded screw 42 through lock washer 44 and threaded apertured nut 46 attached to the spring 38, as shown in FIG. 9. Threaded screws can be attached to each spring and the spring tension of each adjusted e.g. to equalize spring tension of the steering stabilizer of the invention.

In addition the crank arms, e.g. arm 16 shown in FIG. 2, can be replaced with crank arm 48 having threaded channel 49 therein to receive threaded shaft 50 through nut 52 into said channel as shown in FIG. 10, to form an adjustable length crank arm. Thus the steering stabilizer of the invention fits various sized bicycles.

An important feature of the present invention is that the springs 20, 22, 24 and 26 last a long time since they each undergo relatively slight compression during the turning cycle of the cycle steering column. The steering stabilizer of the invention forms a compact unit which mounts out of the way on the cycle frame and a housing such as box 11 protects the workings thereof from dust and weather prolonging the life thereof. In addition, lubrication including oil and/or grease can be deposited in the box to protect and assist the workings of the cycle stabilizer, including the bearing surfaces therein.

From the above description, it can be seen that the cycle steering stabilizer of the present invention provides a ready and effective means to safely stabilize the wheel of a cycle while yet permitting ease of turning of the steering wheel when the cycler wishes to do so. More broadly, the apparatus of the invention is a centering device which tends to center the steering means of cycles and other vehicles. The invention is further useful in machines in which require a centering device either for safety, mechanical control or other purposes.

The resilient steering stabilizer of the invention can be employed with cycles of all types including tricycles, bicycles, motor scooters, motor cycles and various other cycles to render the use thereof much safer. Stronger and heavier springs can be employed with the heavier cycles.

The resilient steering stabilizer of the present invention has at least one crank arm connected to at least one pivot arm, the pivot arm turning around a pivot axle in contact with at least a pair of springs. Where one pivot arm connected to one crank arm is employed, various spring arrangements can be utilized. For example, the crank arm can move against a pair of springs below the pivot axis, e.g. springs 24 and 20 shown in FIG. 2; above the pivot axis, e.g. springs 22 and 26 shown in FIG. 2; above and below the pivot axis, e.g. springs 20 and 26 or springs 22 and 24 as shown in FIG. 2 or against opposed springs above and below the pivot axis, e.g. springs 22, 26, 20 and 24 as shown in FIG. 2. Preferably a pair of crank arms connected respectively to a pair of pivot arms are employed, each pivot arm pressing against one to four resilient means, e.g. springs as discussed above. Highly preferred is the arrangement of two crank arms connected respectively to two pivot arms, each pivot arm pivoting around an axis against at least a pair of springs one above and one below said axis as illustrated in FIG. 4. Of course, more than four springs may be employed as desired within the scope of the invention.

Note that when the pivot arm contacts opposed springs, in pivoting it will compress one spring while extending the other. Whereas while it pivots in contact with springs on opposite sides of the pivot axis it can, as in the case of FIG. 4, exert compression on both such spaced springs.

In addition to the helical springs illustrated in the drawing, various other resilient means including other springs can be employed to restrain the pivot arms either by contraction, compression and/or tension and extension. Preferably, as illustrated in the drawings, helical springs are employed. These springs can be replaced with springs of heavier or lighter guage to increase or decrease the spring strength applied to the pivot arms.

Where desired, the pivot arms can be connected directly to the resilient means, e.g. the helical springs, such as where a coil of the spring passes through an aperture in the pivot arm. Preferably however, the pivot arms contact bearing surfaces which are connected to the resilient means, e.g. helical springs, such as shown in FIGS. 2 and 4. As stated above, the bearing plates can take various shapes and can be two or more in number. The plates can be straight, or diamond shape, as illustrated in FIGS. 2 and 4. The diamond shape of such plates, can be replaced by an arch or other shape where desired. The illustrated shape of the bearing plates serves to urge the respective pivot arms diamond shape (which can also be round or other shapes) to a central position relative to the springs.

The materials employed in the steering stabilizer of the present invention can be of wood, plastic, metal and the like. Preferably the resilient means, e.g. springs, are of metal such as steel. However, such resilient means can take other forms, e.g. plastic helical or other springs, elastic, including shock cord or other type springs. The pivot and crank arms are preferably of metal, e.g. steel or other durable metal. Such arms can also be of plastic where desired.

The steering stabilizer housing with the pivot arms, the bearing plates and the springs can be of wood, metal and plastic, as desired. Preferably, the housing is of plastic, and/or metal such as steel. All the parts of the steering stabilizer including the housing can be of metal coated with plastic, rubber materials, paint and the like where desired.

The crank arms are preferably connected to the steering column at the steering fork, the handle bars or other rotatable portion of the steering column. Preferably, the crank arms connect from the pivot arms of the steering stabilizer to the cycle steering fork.

The steering stabilizer of the invention is desireably positioned behind the steering column adjacent the cycle frame. However, such steering stabilizer can also be positioned elsewhere on the cycle frame where desired, e.g. on the underside of the cycle frame where the crank arms are connected to the steering fork or be positioned forward of the steering column, where desired or other convenient locations, within the scope of the present invention. Preferably, the steering stabilizer is situated behind the steering column, adjacent the frame bars of the cycle as illustrated in FIG. 1.

What is claimed is:

1. A resilient steering stabilizer for a cycle comprising, at least one crank arm; one end of said crank arm connecting to a rotatable portion of the steering column of said cycle; a pivot arm which turns around a pivot means; the other end of said crank arm connecting to said pivot arm; a plurality of resisting springs mounted on said cycle, at least one on each side of said pivot means; said pivot arm distorting said springs on each side of said pivot means to resiliently resist excessive turning of the steering wheel of said cycle.

2. The steering stabilizer of claim 1 having a pair of first and second crank arms, one end of each crank arm being connected to spaced points on a rotatable portion of the cycle steering column; a first pivot arm which pivots about an axle; a second pivot arm which pivots about an axle; the other end of the first crank arm connecting to said first pivot arm; the other end of said second crank arm connecting to said second pivot arm; each pivot arm pressing against said resisting springs mounted on each side of the axle thereof.

3. The steering stabilizer of claim 2 wherein said pivot arms turn about a common axle.

4. The steering control of claim 3 wherein said pivot arms turn in opposite directions when said steering column turns, each pivot arm compressing at least two resisting springs.

5. The steering stabilizer of claim 2 wherein a bearing plate is positioned between each pivot arm and a spring adjacent thereto.

6. The steering stabilizer of claim 2 wherein said springs are helical springs mounted in a housing affixed to the frame of a bicycle.

7. The steering stabilizer of claim 2 wherein said springs are connected to adjustable tension means.

8. The steering stabilizer of claim 2 wherein one end of each crank arm is connected to opposed points on the handle bars of said cycle.

9. The steering stabilizer of claim 2 wherein one end of each crank arm is connected to opposed points on the steering fork of said cycle.

10. The steering stabilizer of claim 4 wherein two bearing plates are positioned one opposite sides of said pivot arms and between them and the springs adjacent thereto.

* * * * *